United States Patent [19]

Ullrich et al.

[11] Patent Number: 4,545,954

[45] Date of Patent: Oct. 8, 1985

[54] DEVICE FOR SHUTTING DOWN A HIGH-TEMPERATURE NUCLEAR REACTOR

[75] Inventors: Manfred Ullrich, Bergisch-Gladbach; Herbert Reutler, Cologne; Hubert Schepers, Bergisch-Gladbach, all of Fed. Rep. of Germany

[73] Assignee: GHT Gesellschaft für Hochtemperaturreaktor-Technik mbH, Bergisch-Gladbach, Fed. Rep. of Germany

[21] Appl. No.: 346,879

[22] Filed: Feb. 8, 1982

[30] Foreign Application Priority Data

Feb. 9, 1981 [DE] Fed. Rep. of Germany ....... 3104481

[51] Int. Cl.[4] .......................... G21C 7/22; G21C 3/26
[52] U.S. Cl. .................................. 376/220; 376/221; 376/337; 376/338; 376/381
[58] Field of Search ............... 376/220, 221, 337, 338, 376/381

[56] References Cited

U.S. PATENT DOCUMENTS

| | | | |
|---|---|---|---|
| 3,046,212 | 7/1962 | Anderson | 376/221 |
| 3,140,235 | 7/1964 | Hatch et al. | 376/381 |
| 3,244,597 | 4/1966 | Tower | 376/381 |
| 3,257,286 | 6/1966 | Ryon et al. | 376/338 |
| 3,284,307 | 11/1966 | Schortmann | 376/221 |
| 3,383,285 | 5/1968 | Ackroyd et al. | 376/221 |
| 4,030,974 | 6/1977 | Neef | 376/381 |

FOREIGN PATENT DOCUMENTS

| | | | |
|---|---|---|---|
| 0057868 | 1/1982 | European Pat. Off. | 376/338 |
| 2461356 | 7/1975 | Fed. Rep. of Germany | 376/338 |
| 1258757 | 3/1961 | France | 376/338 |
| 5419091 | 2/1979 | Japan | 376/338 |
| 201944 | 2/1966 | Switzerland | 376/337 |

*Primary Examiner*—Sal Cangialosi
*Attorney, Agent, or Firm*—Herbert L. Lerner; Laurence A. Greenberg

[57] ABSTRACT

Device for shutting down a high-temperature nuclear reactor having a reactor core, including a reflector disposed outside the reactor core, channels being disposed in the reflector and having lower ends, storage bins being disposed above the reactor core and being in communication with the channels above the lower ends thereof, a neutron-absorbing material formed of fluidic bodies being storable in the storage bins and feedable into the channels, a plurality of lines connected between the lower ends of the channels and the storage bins, means for selectively establishing an upwardly directed fluid flow of the material in one of the plurality of lines for conveying the neutron-absorbing material at a given adequate speed from one of the channels into one of the storage bins.

2 Claims, 1 Drawing Figure

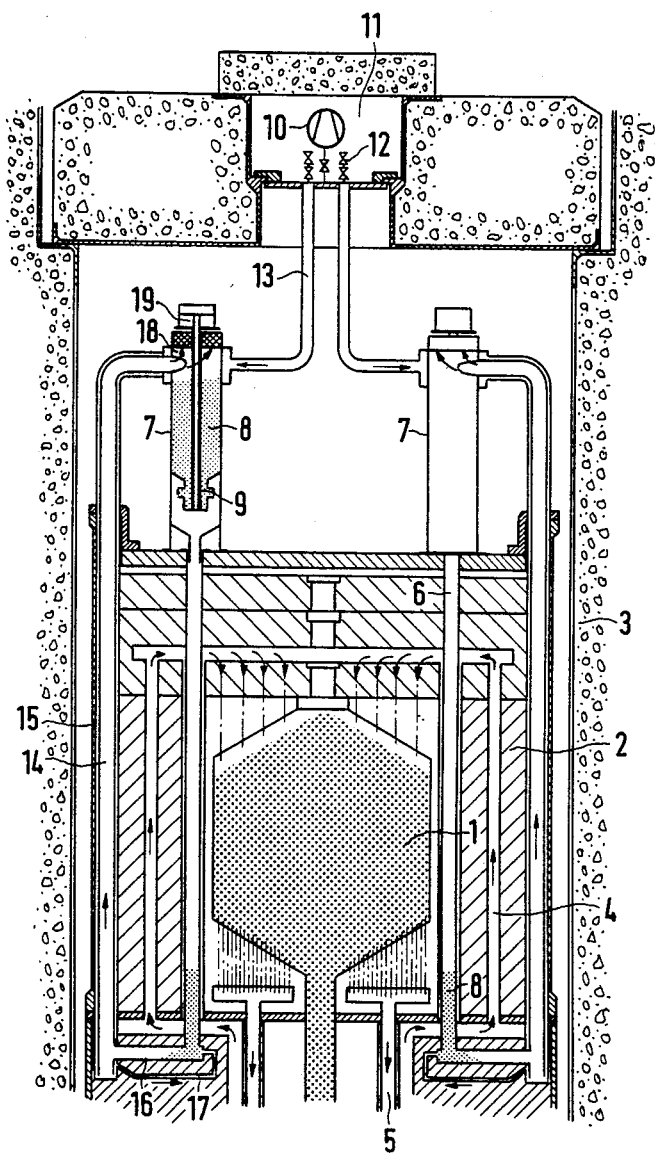

DEVICE FOR SHUTTING DOWN A HIGH-TEMPERATURE NUCLEAR REACTOR

The invention relates to a device for shutting down a high-temperature nuclear reactor by means of neutron-absorbing material, which can be fed into channels disposed in a reflector. With the thorium high-temperature reactor (THTR) under construction at Uentrop, the automatic control and, if necessary, the shutdown of the reactor, is, among other things, activated by rods, which can be moved up and down in channels disposed in the reactor, and which drop into these channels under the effect of gravity alone for purposes of a rapid shutdown or scram, upon being detached from their mountings. Because conventionally the reactor is assembled from a multitude of singular graphite blocks, and any operational changes produced in the shape and dimensions of these blocks (e.g., by neutron induced swelling expansion) cannot be completely ruled out, an obstruction of control rod motions because of a mutual offset of singular channel sections in various blocks is conceivable. Proposals made also include that of storing small balls of a neutron-absorbing material in tanks or bins above the reactor core, and upon a breakdown of the aforementioned primary shutdown stage having these balls trickle or flow into the bed or fill of globular or spherical fuel elements.

It is accordingly an object of the invention to provide a device for shutting down a high-temperature nuclear reactor, which overcomes the hereinafore-mentioned disadvantages of th heretofore-known devices of this general type, wherein the feeding of neutron-absorbing material into channels disposed for this purpose in the reactor side-reflector cannot be impaired by minor distortions of these channels, and which beyond this is suitable for solving a problem prevailing with all nuclear reactors, which is only presently managed by arranging a system of complex safety loops:

This is to assure, e.g., that upon reactor startup only the respectively requested absorber rod (or a specified group of rods) is ejected from its shutdown position and not, e.g., by oversight, including any further rods.

With the foregoing and other objects in view there is provided, in accordance with the invention, a device for shutting down a high-temperature nuclear reactor having a reactor core, comprising a reflector disposed outside the reactor core, channels being disposed in the reflector and having lower ends, storage bins being disposed above the reactor core and being in communication with the channels above the lower ends thereof, a neutron-absorbing material formed of fluidic bodies being storable in the storage bins and feedable into the channels, a plurality of lines connected between the lower ends of the channels and the storage bins, means for selectively establishing an upwardly directed fluid flow of the material in one of the plurality of lines for conveying the neutron-absorbing material at a given adequate speed from one of the channels into one of the storage bins.

For example, if the neutron-absorbing material assumes the shape of small balls (approximating the aforementioned type), then this assures that even slightly deformed channels can be filled over the entire required range, because these channels, for other unrelated reasons, already have a cross-section exceeding that of the balls. The balls, under the effect of gravity, simply flow out from their storage bins disposed above the reactor core, that is while under maximal safety conditions and by using the simplest type of structural components. These balls are again removed on demand from their channels by floating or preferably blowing them upward through delivery pipes. By controlling the output of a pneumatic conveyor-type fluid blower, the respective emptying of only one channel at a time is assured; in case the blower is simultaneously switched to two or more channels because of a switching failure, then the fluid flow spread out over a multiple of the intended cross-section cannot reach the velocity required for removing the balls from the channels.

With an option or (possibly for reasons of symmetry) a demand for emptying two or more channels simultaneously, the blower according to the invention can be dimensioned in such a way that the fluid flow is adequate for emptying a permissible amount of channels if not more, simultaneously. Use is made of this option in conjunction with another feature of the invention, in which the storage bins are combined into a single storage bin, and the plurality of lines are connected between the channels and the single storage bin. With conventional shutdown rods, the size of rod drives limits the amount of rods disposed peripherally with respect to the vessel, so that any local discontinuities in the absorber effect can only be countered with relatively great difficulty. With the device proposed in this case, the absorber balls can be distributed over a plurality of narrower channels, which can also only be emptied together, so that the absorber effect is averaged out.

Other features which are considered as characteristic for the invention are set forth in the appended claims.

Although the invention is illustrated and described herein as embodied in a device for shutting down a high-temperature nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing, which is a fragmentary, diagrammatic, axial longitudinal sectional view of a component of a high-temperature nuclear reactor according to the invention.

Referring now particularly to the single FIGURE of the drawing, there is seen a reactor having a core 1 including numerous spherical fuel elements; in this case any illustration of facilities for the delivery and removal of fuel elements is omitted because they are not essential to the invention. The reactor core is located inside a cavern, which is disposed in a reflector 2. The entire reactor is confined in a pressure vessel 3. The reactor core 1 is cooled by helium, which is circulated by means of a non-illustrated blower, rises in channels 4, is deflected in the direction of the arrow at the upper end of the reflector, and from up there is blown into the cavern. The heated-up gas arrives at collector lines 5, through openings in the cavern bottom, through which it is fed to the non-illustrated heat consuming parts of the installation. Immediately adjacent to the core 1 in the reflector 2, there are disposed further channels 6, which can be completely or partially filled from above with a fluid of neutron-absorbing material having approximately the shape of balls 8 of boron carbide being about 1 cm in diameter. During normal operation, the balls 8 are located in storage bins or tanks 7, which are disposed above these further channels 6 and therefore also above the core 1. The bins 7 are provided on their bottom ends with a conventional control lock 9, i.e., with a trough, which in a respective position relative to the opening of the bin 7 locks this opening by means of the backwash of the balls 8 stored therein. In case of a scram or shut down, upon a lowering of this trough or upon the dropoff of a then currentless electromagnet (a type of releasing absorber rod known to those skilled in the art) the opening of the storage bins 7 is cleared, and the absorber balls 8 are enabled to flow into these further channels 6. For the removal of the absorber balls 8 from the channels 6, such as upon a reactor startup, a blower 10, which in this case is only diagrammatically shown, is put into operation. The fluid compressed in the blower 10, which is preferably helium too, is fed to a collecting chamber 11, from which lines 13 each having closeable valves 12 are led out. When opening one of the valves 12, a gas stream flows through the line 13 and further through an annular space between two lines 14, 15, and, upon a flow directiona reversal at the annular bottom end, back again through the interior of the line 14, with the absorber balls 8 being consecutively entrained. Disposed at the bottom end of each of the channels 6, there is a ball reducer 16, which proportionally feeds the absorber balls 8, being backed up at the bottom end of the channels 6, into the (inner) line 14 through a bypass line 17. The line 14 terminates at the upper end thereof in a cyclone separator 18, in which the entrained absorber balls 8 drop out of the gas stream and back into the storage bins 7. The gas used for conveying the absorber balls is released into the interior of the pressure vessel 3 through a filter 19 for retaining any dust originating from the absorber balls.

The output of the blower 10 is adjusted in such a way that the pressure built up in the collecting chamber 11 is just high enough to produce a fluid flow in one of the annular spaces between the pipes 14, 15 for enabling it to convey absorber balls 8 back into the bins 7. If, because of an oversight, two or more valves 12 are simultaneously opened, then the gas stream is distributed over so many pipelines that the flow velocity is sharply reduced to the extent of stopping any upward conveyance of absorber balls. Thus any simultaneous drainage of a plurality of channels 6 produced by an oversight is safely avoided, along with any consequently produced detrimental effects on the neutron-physical conditions in the core 1. To obtain a more uniform neutron-physical effect of absorber balls 8 on the core 1, it is of advantage to split up each of the channels 6 into a plurality of part channels closely adjacent each other (in an extreme case up to a merger of channels in an annular loop separating the reflector 12 in two concentric parts), which are filled from a respective single storage bin 7, and also are simultaneously drained again through a respective common line 14.

We claim:

1. Device for shutting down a high-temperature nuclear reactor having a reactor core, comprising a reflector disposed outside the reactor core, channels being disposed in said reflector and having lower ends, storage bins being disposed above the reactor core and being in communication with said channels above said lower ends thereof, a neutron-absorbing material formed of fluidic bodies being storable in said storage bins and feedable into said channels, a plurality of lines connected between said lower ends of said channels and said storage bins, means for selectively establishing an unwardly directed fluid flow of said material in one of said plurality of lines for conveying said neutron-absorbing material at a given adequate speed from one of said channels into one of said storage bins.

2. Device according to claim 1, wherein said storage bins are combined into a single storage bin, and said plurality of lines are connected between said channels and said single storage bin.

* * * * *